United States Patent
Yamashita et al.

(10) Patent No.: US 8,303,026 B2
(45) Date of Patent: Nov. 6, 2012

(54) CABIN UNIT FOR WORK MACHINE

(75) Inventors: Yuji Yamashita, Sakai (JP); Hideo Imai, Kinokawa (JP); Hiroyuki Anami, Kaizuka (JP); Satoshi Shimura, Zama (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/053,709

(22) Filed: Mar. 22, 2011

(65) Prior Publication Data

US 2011/0233963 A1 Sep. 29, 2011

(30) Foreign Application Priority Data

Mar. 29, 2010 (JP) ................................ 2010-075385

(51) Int. Cl.
*B60J 1/04* (2006.01)
*B62D 33/06* (2006.01)

(52) U.S. Cl. .................. 296/190.1; 296/190.11; 296/90; 296/146.16

(58) Field of Classification Search ............... 296/190.1, 296/190.11; 49/449; 292/119
See application file for complete search history.

(56) References Cited

U.S. PATENT DOCUMENTS 4,174,129 A * 11/1979 Schwandt et al. ............ 292/216
8,016,345 B1 * 9/2011 Goddard et al. ......... 296/190.01

FOREIGN PATENT DOCUMENTS

| JP | 2002-327571 | * 11/2002 |
| JP | 2004130828 A | 4/2004 |

* cited by examiner

*Primary Examiner* — Dennis Pedder
(74) *Attorney, Agent, or Firm* — The Webb Law Firm

(57) ABSTRACT

A cabin unit for a work machine comprises a cabin frame including a ceiling frame forming a top portion of the cabin frame, and a door open frame forming a front portion of the cabin frame; a door provided in the door open frame; a door opening/closing mechanism for supporting the door from the door open from to the ceiling frame to be moved rearward and upward from a closed position for closing the door to an open position in which a front surface of the door in the closed position is directed upward; a locking mechanism provided above the door for limiting movement of the door when in the closed position or the open position; and a first unlocking mechanism provided in the door for unlocking the locking mechanism. The first unlocking mechanism includes an internal control member for releasing the locked state from the inside of the door, and an external control member for releasing the locked state from the outside of the door.

4 Claims, 13 Drawing Sheets

CABIN UNIT FOR WORK MACHINE

FIELD OF THE INVENTION

The present invention relates to a cabin unit for a work machine such as a truck loader and a skid loader, for example.

DESCRIPTION OF THE RELATED ART

One of the examples of the cabin unit for the work machine is known from Japanese Unexamined Patent Application Publication No. 2004-130828. This cabin unit includes a door made of a transparent material and provided in a door open frame mounted in a front portion of the cabin, an upper handle provided in an upper portion of the front surface of the door, and a lower handle provided in a lower portion of the back surface of the door. In this cabin unit, the door is shiftable to change its position by moving rearward and upward from a closed position with the front surface oriented forward to an open position with the front surface up. In this cabin unit, it is difficult to prevent clattering when the door is in the closed position or the open position.

SUMMARY OF THE INVENTION

In view of the above, it is desired to provide a work machine that can prevent clattering when the door is in either the closed position or open position.

A cabin unit for a work machine according to the present invention comprises:

a cabin frame including a ceiling frame forming a top portion of the cabin frame, and a door open frame forming a front portion of the cabin frame;

a door provided in the door open frame;

a door opening/closing mechanism for supporting the door from the door open from to the ceiling frame to be moved rearward and upward from a closed position for closing the door to an open position in which a front surface of the door in the closed position is directed upward;

a locking mechanism provided in an upper portion of the door for limiting movement of the door when in the closed position or the open position; and a first unlocking mechanism provided in the door for unlocking the locking mechanism, the first unlocking mechanism including an internal control member for releasing the locked state from the inside of the door, and an external control member for releasing the locked state from the outside of the door.

In the above-noted arrangement, it is preferable that a first unlocking mechanism is provided in a lower portion of the door.

In the above-noted arrangement, it is preferable that second unlocking mechanisms are provided in vertical intermediate portions at lateral opposite sides of a back surface of the door.

In the above-noted arrangement, it is preferable that the first unlocking mechanism is connected to each of the second unlocking mechanisms through a first operational-force transmitting mechanism, and each of the second unlocking mechanisms is connected to the locking mechanism through a second operational-force transmitting mechanism.

In the above-noted arrangement, it is preferable that a lower handle is provided in a lower portion of a front surface of the door in the vicinity of the first unlocking mechanism, an upper handle is provided in an upper portion of the front surface of the door, and a middle handle is provided in each of the second unlocking mechanism.

The door is supported to door opening/closing mechanism and is movable from the closed position in which the door is in contact with the door open frame for closing the door opening to the open position in which the door is positioned substantially along the ceiling frame. The door is locked in the closed position and the open position by the locking mechanism to be limited in moving, which prevents the door from clattering in both the positions.

The locking mechanism is unlocked by the first unlocking mechanism. Internal and external control members are provided for unlocking the first locking mechanism to perform an unlocking operation when the door is either in the closed position or open position.

The first unlocking mechanism is provided in the lower portion of the door. When the door is in the closed position, the operator can perform the unlocking operation from the outside of the cabin unit by using the external control member or from the inside of the cabin unit by using the internal control member, and then grips the lower handle or middle handles to raise the door to the open position.

When the door is in the open position, the lower portion of the door is positioned in the front portion of the ceiling frame. Thus, the operator can perform the unlocking operation to unlock the locking mechanism through the first unlocking mechanism by using the internal control member from either the outside or the inside of the cabin unit. Then, the operator grips the lower handle from the outside of the cabin unit, or grips the middle handles from the inside of the cabin unit to lower the door.

When the door is opened or closed from the inside of the cabin unit, the operator can unlock the locking mechanism by the second unlocking mechanism and then grip the lower handle or middle handles to raise or lower the door.

The first unlocking mechanism is provided in the lower portion of the door, while the second unlocking mechanisms are provided in vertical intermediate portions of the back surface of the door in lateral opposite sides thereof. The first unlocking mechanism is connected to the second unlocking mechanisms through the first operational-force transmitting mechanism. Thus, the operator can unlock the locking mechanism either from the lower portion of the door or from the vertical intermediate portions of the back surface of the door. Further, the first unlocking mechanism can also act as the second operational-force transmitting mechanism.

DETAILED DESCRIPTION OF PREFERRED EMBODIMENTS

An embodiment of the present invention will be described hereinafter in reference to the accompanying drawings.

Figure 14:
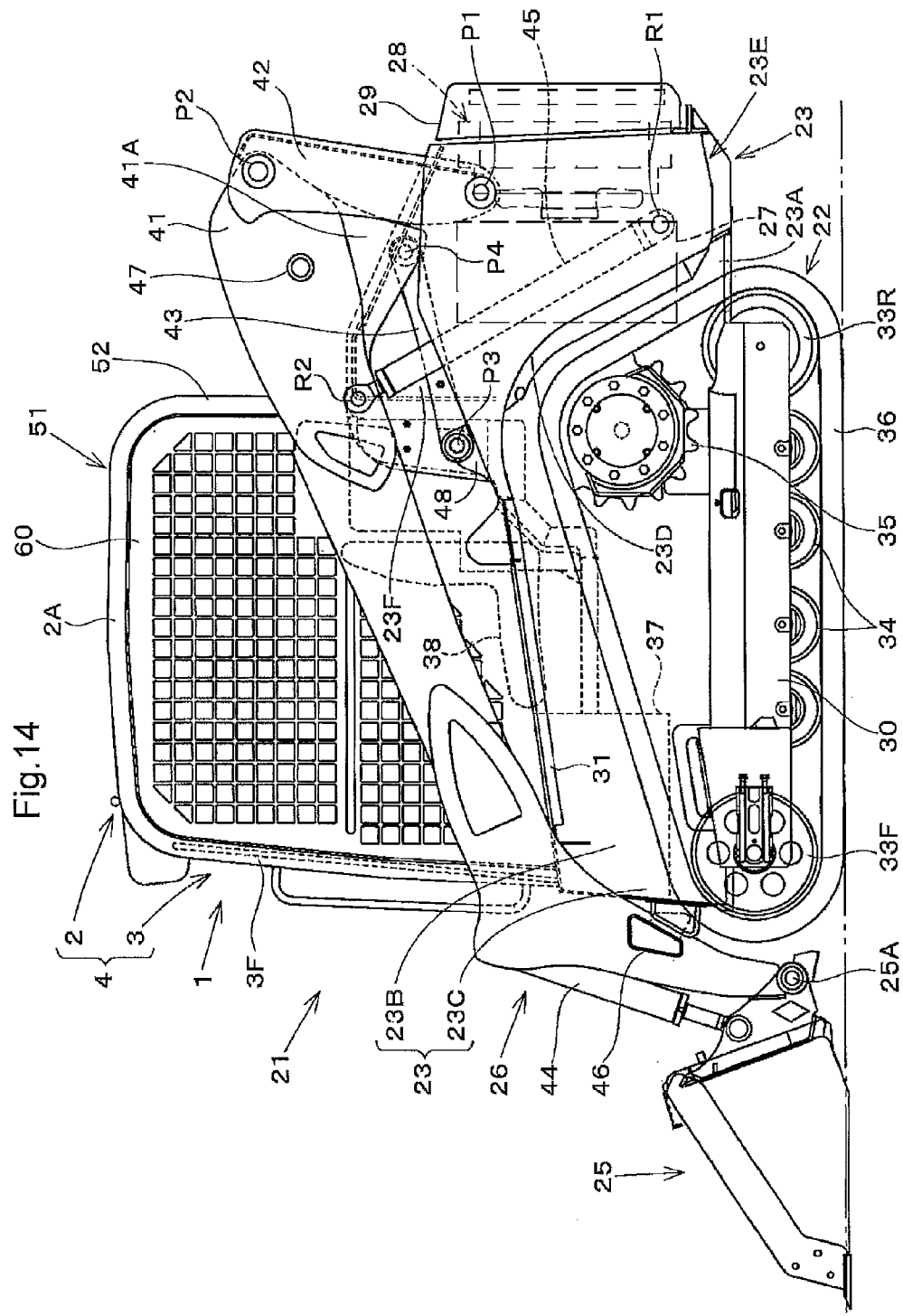
FIG. 14 is a side view of a work machine.

FIG. 14 shows a work machine 21 equipped with a cabin unit 1. The work machine 21 is a loading work machine (track loader), and comprises a vehicle frame 23 suspending a running apparatus 22 therefrom. The cabin unit 1 is provided in a front portion of the vehicle frame 23. The work machine 21 further comprises an working implement (excavating working implement) 26 supported at a proximal portion thereof to opposite lateral ends of a rear portion of the vehicle frame 23 for vertically moving a working tool (bucket) 25 mounted forwardly of the cabin unit 1, an engine 27 and a cooling device 28 mounted at the rear portion of the vehicle frame 23, and a hood 29 for openably and closably covering an opened rear end of the vehicle frame 23.

The vehicle frame 23 has a box-shaped frame body portion that is made of a steel plate and includes a bottom wall 23A, right and left lateral walls 23B, front wall 23C, and right and left rear walls 23D. Support frame members 23E are secured to the right and left rear walls 23D projecting outward from the rear end of the right and left lateral walls 23B, and a bridge member 23F is secured to a rear upper portion of the frame body portion to connect upper portions of the right and left rear walls 23D and the support frame members 23E to each other.

The frame body portion of the vehicle frame 23 has a forward portion from the bridge member 23F that is open upward in which the cabin unit 1 can be provided, a rearward portion from the bridge member 23F that is open upward in which the engine 27 can be mounted from above, and a back side portion that is open rearward to allow access to the engine 27 and cooling device 28 from the rear for inspection and maintenance. Each of the right and left frame members 23E is made of sheet metal material and has an inner wall, outer wall and rear wall. The inner wall and outer wall are secured at forward edges thereof to each rear wall 23D of the frame body portion to form a box shape as a whole.

The inner wall of the support frame member 23E projects upward to a larger extent than the outer wall. The bridge member 23F is secured at lateral ends thereof to upper portions of the inner walls of the support frame members 23E. Each support frame member 23E has a front wall defined by each of the rear walls 23D of the frame body portion and also acts as a fender for covering a rear portion of the running apparatus 22.

To the lateral wall 23B of the frame body portion is attached a hydraulic motor for the running apparatus. A track frame 30 is fixed to a lower portion of an external surface of the frame body portion, and a fender 31 is fixed to an upper edge of the external surface of the frame body portion. The fender 31 is connected to an upper end of the rear wall 23D of the support frame member 23E.

The running apparatus 22 includes a pair of right and left crawler-type running devices, each of which is formed with front and rear follower wheels 33F and 33R and a plurality of rolling wheels 34, all of which are supported by the track frame 30, and a crawler 36 wound around the follower wheels, rolling wheels and a driving wheel 35 attached to the hydraulic motor.

The running apparatus 22 may include a front-and-rear wheel-type running device, or a front-wheel and rear-crawler-type running device, instead of the crawler-type running device.

The cabin unit 1 is mounted above a front half of the vehicle frame 23 and includes a platform 37, and a driver's seat 38 and control devices disposed on the platform. The platform 37 of the cabin unit 1 is provided in a rear half of a cabin bottom. A front half of the cabin bottom is opened downward to allow the operator seated on the driver's seat 38 to rest their feet on a step 39 provided within the frame body portion. The cabin unit 1 includes an entrance provided at the front thereof.

The cabin unit 1 includes a pivotal shaft provided in a lower back side thereof. The pivotal shaft is supported by a support bracket mounted on the top surface of the bridge member 23F. A damper for vertically moving the cabin is provided between the cabin unit 1 and the frame body portion.

The front half of the cabin unit 1 is vertically movable about the lower back side thereof from a front downward position to a rear upward position. Attachments can be accessed for maintenance by raising the cabin unit to open the interior of the frame body portion.

The working implement 26 includes the working tool (bucket) 25, a pair of right and left arms 41 pivotably connected to the working tool 25 at distal ends thereof through a pivotal shaft 25A, lift links 42 pivotably connected to proximal portions of the right and left arms 41, control inks 42 pivotably connected to the vicinity of the proximal portions of the right and left arms 41, working tool cylinders 44 provided between the work tool 25 and the arms 41, and arm cylinders 45 provided between the arms 41 and the support frame members 23E.

The right and left arms 41 are connected to each other at front and rear portions thereof by a front connecting member 46 and a rear connecting member 47 to be vertically movable at lateral opposite sides of the cabin unit 1. The front connecting member 46 comes into contact with the front wall 23C of the frame body portion when the arms 41 are lowered to the lowest position. The rear connecting member 47 is made of a pipe and positioned slightly forwardly of rear ends of the arms. The right and left arms 41 have side walls opposed to each other having proximal portions forming triangle downward projecting portions 41A.

Each of the control link 42 is vertically oriented and includes a lower portion inserted into each support frame member 12E to be pivotable about a first pin P1, and an upper portion connected to a proximal portion of each arm 41 located rearwardly of the rear connecting member 47 through a second pin P2 to be swingable to move back and forth.

Each of the control links 43 is longitudinally oriented and includes a front portion pivotably supported by an upper portion of the inner wall of each support frame member 23E and a support member 48 fixed to a front upper portion of the rear wall 23D of the frame body member through a third pin P3, and a rear portion connected to the projecting portion 41A provided in the vicinity of the proximal portion of each arm 41 through a fourth pin P4. The control link 43 is swingable to allow the rear portion thereof to be raised from a substantial horizontal position.

Each of the arm cylinders 45 includes a tubular lower portion inserted into each support frame member 23E to be connected thereto through a first connecting pin R1, and a cylinder rod distal end connected to each arm 41 through a second connecting pin R2.

The first pin P1 is positioned in the vicinity of the rear end upper portion of the vehicle frame 23, and the third pin P3 is positioned slightly higher than the first pin P1 to longitudinally overlap the rear portion of the cabin unit 1.

The first connecting pin R1 is positioned slightly forwardly of the first pin P1. The second connecting pin R2 is opposed to the second pin P2 with the rear connecting member 47 therebetween to be substantially linearly arranged. A distance from the second pin P2 to the second connecting pin R2 is longer than a distance from the second pin P2 to the fourth pin P4 and is shorter than a distance from the second pin P2 to the third pin P3. The arm cylinder 45 crosses the control link 43 as viewed from the side.

FIG. 14 shows the lowest position of the arms 41 with the working tool 25 contacting the ground, in which each lift link 42 assumes a rearward slanting posture with the second pin P2 being positioned slightly rearwardly of the first pin P1, each control link 43 assumes a rearwardly upward slanting posture with the fourth pin P4 being positioned slightly higher than the third pin P3, each arm 41 assumes a forwardly downward posture with the second connecting pin R2 being positioned lower than the second pin P2 and higher than the fourth pin P4, each arm cylinder 45 crosses a substantial longitudinal mid portion of the control link 43 and is substantially perpendicular to a center line extending between the second pin P2 of the arm 41 and the pivotal shaft 25A.

The arm 41, lift link 52 and control link 43 forms a four-point link structure with the four pins, the first to fourth pins, acting as joints. As the arm cylinder 45 is extended, the arm 41 is raised pivotably about the second pin P2 with the lift link 42 swinging back and forth while being restricted by the control link 43.

The lift link 42 is configured not to project rearwardly of the hood 29 over the entire range of the vertical movement of the arm 41 from the lowest position to the highest position. The control link 43 shifts from the rearwardly upward position to the rearwardly downward position by vertically swinging within a range smaller than 90 degrees.

Referring to FIGS. 1 to 5 and 14, the cabin unit 1 includes a top ceiling frame 2 and a front door open frame 3 to form a cabin frame 4. The door open frame 3 forms the entrance 56 that is openable and closable by a door 5 made of a transparent material.

Numeral 51 denotes a pair of right and left main frame members made of a pipe material or deformed material that is bent into a gate shape. Each main frame 51 consists of a side member 2A of the ceiling frame 2, a front strut 3F of the door open frame 3, and a rear strut 52.

The ceiling frame 2 has a rectangular shape as viewed from the top defined by the lateral opposite side members 2A, an upper cross member 2B for connecting the opposite side members 2A to each other at front portions thereof, and a rear cross member 2C for connecting the opposite side members 2A to each other at rear portions thereof. An outer roof 53 and an inner roof 54 are attached to the ceiling frame 2 to form a ceiling 55 of the cabin unit 1.

The door open frame 3 has a rectangular shape as viewed from the front defined by the right and left front struts 3F, the upper cross member 2B for connecting the right and left front struts 3F at upper portions thereof, and a lower cross member 3A for connecting the right and left front struts 3F at lower portions thereof. The door open frame 3 assumes a rearwardly slanting posture with the upper portion thereof being positioned rearwardly of the lower portion.

When the cabin unit 1 is placed on the frame body portion, the bottom surface of the lower cross member 3A is placed on the front wall 23C through a cushion member.

A side wall plate 57 is provided in each of the right and left main frame members 51 to be surrounded by the side member 2A, the front strut 3F and the rear strut 52. The side wall plate 57 includes upper and lower windows. The upper window is a sliding pane 58 while the lower window is a fixed-sash pane or swing-type pane 59, both of which are made of a transparent material such as glass or plastic.

Further, a protective plate 60 that is formed by punched metal or a wire net is provided outside of the side wall plate 57 in each of the right and left main frame members 51 to protect the sliding pane 58 and the fixed-sash pane 59 with ventilation being guaranteed.

The cabin unit 1 has a back surface defined by the rear cross member 2C, the rear struts 52 and a rear lower member 61 for connecting the rear struts 52 to each other at lower portions thereof to form a rear window frame 62. A rear pane 63 made of a transparent material is provided in the rear window frame 62 to be openable and closable.

The door 5 for opening and closing the entrance 56 provided in the door open frame 3 includes a door frame 5A having a rectangular shape as viewed from the front, and a door plate 5B fixed to the door frame 5A and made of a transparent material such as glass or plastic. A wiper device is attached to one lateral side of the front surface of the door.

The door 5 further includes upper and lower handles 13 and 14 provided in the front surface thereof, and a pair of right and left middle handles 15 provided in the back surface thereof (inside of the cabin) at vertically intermediate portions.

Referring to FIGS. 1, 3 and 5 to 8, a door opening/closing mechanism 6 is provided between the ceiling frame 2 and door open frame 3 and the door 5 for openably and closably supporting the door 5, which includes a position change mechanism 16 for supporting the door 5 to be changeable in position, a locking mechanism 7 for limiting movement of the door 5 when the door is shifted to a closed position A and an open position B, and a first unlocking mechanism 8 and a second unlocking mechanism 10 for unlocking the locking mechanism 7.

The door 5 is located in the closed position A when closing the entrance 56 to assume an upright posture with the front surface forwardly oriented, and in the open position B when opening the entrance 56 to assume a lying posture with the front surface up. The position change mechanism 16 of the door opening/closing mechanism 6 is configured to move the door 5 between a front lower position and a rear upper position.

The position change mechanism 16 includes a pair of right and left support brackets 70 fixed to the front portion of the ceiling frame 2 or the upper portion of the door open frame 3, and swingable links 71 each pivotably supported to the right or left support brackets 70 at one end thereof through an upper pivot pin 71a. The right and left swingable links 71 are connected to each other to swing in unison through a connecting rod 72.

The swingable links 71 are each pivotably supported to connecting brackets 73 fixed to the door frame 5A of the door 5 at the other end thereof through a lower pivot pin 71b. The lower pivot pin 71b is located in a substantial vertical mid position of the door 5 to generally keep the vertical weight balance.

A damper 74 is connected to an upper portion of each swingable link 71 at an upper end thereof in the vicinity of the upper pivot pin 71a, and connected to each of the right and left front struts 3F of the door open frame 3 at a lower end thereof. The damper 74 provides each swingable link 71 with a pivoting force in a rearward upward direction to assist the opening operation of the door 5.

Pairs of right and left rollers 75U and 75D are provided in upper and lower portions of the door frame 5A. In the side wall plate 57 or the main frame member 51 fixing the side wall plate thereto are mounted longitudinal guide rails for guiding the upper rollers 75U in the longitudinal direction and a vertical guide rails for guiding the lower rollers 75D in the vertical direction. This arrangement allows the upper and lower ends of the door 5 to move in the right directions when the position of the door 5 is changed.

Referring to FIGS. 1 to 8, the locking mechanism 7 of the door opening/closing mechanism 6 includes support bases 77 fixed to right and left upper portions of the door frame 5A, a receiving member 78 fixed to each support base 77, an engaging member 79 and a locking member 80 pivotably supported to each support base 77 and/or receiving member 78, and a pin-like engaged member 81F fixed to a front portion of the ceiling frame 2 or an upper portion of the door open frame 3. The receiving member 78 is fitted on the engaged member 81F, with which the engaging member 79 is engaged to prevent disengagement of the receiving member from the engaged member 81F. The locking member 80 prevents the engaging member 79 from pivoting back.

The receiving member 78 has a recess 78a for receiving and coming into contact with the engaged member 81F. The engaging member 79 has forked holding portions 79b for holding the engaged member 81F received at an engaging recess 79a therebetween, and a stepped engaging stopper 79c formed at the substantially circumferential opposite side to the engaging recess 79a. The engaging member 79 is pivotable about a pivotal shaft 82. The engaging recess 79a is urged to open forward by a return spring 83.

The locking member 80 is pivotably supported by a shaft 84 at an intermediate portion thereof, and has an engageable stop portion 80a formed at one end thereof for to be engaged with the stepped engaging stopper 79c of the engaging member 79. The locking member 81 is urged to a locking direction (clockwise in FIG. 8) by an action spring 85.

The engaging member 79 is in the position in which the engaging recess 79a is opened forward before the door A is moved to the closed position A. When the door A is moved to the closed position A, the engaging recess 79a is fitted on the engaged member 81F and then the engaged member 81F is guided by a lower side of the receiving recess 78a of the receiving member 78 to be introduced into the inner side of the receiving recess 78a. In this time, the engaging member 79 is also pivoted against the urging force of the return spring 83 until the receiving recess 78a is crosswise positioned relative to the engaging recess 79a. Then, the engageable stop portion 80a of the rocking member 80 is engaged with the stepped engaging stopper 79c by action of the action spring 85 to prevent return movement of the engaging member 79 thereby to lock the engaging member 78 against the engaged member 81F.

The engaged member 81F is provided for the closed position A while another engaged member 81R is provided in a rear portion of the ceiling frame 2 for the open position B. When the door 5 assumes the lying posture with the front surface up, the receiving member 78 and the engaging member 78 are brought to engage with the engaged member 81R for the open position.

A release rod 87 is connected to an end of the locking member 80 that is opposite to the engageable stop portion 80a. When the release rod 87 is pushed up, the locking member 80 is pivoted in an unlocking direction (counterclockwise in FIG. 8) against the action spring 87 to disengage the engageable stop portion 80a from the stepped engaging stopper 79c. Then, the engaging member 79 is pivoted by action of the return spring 83 to push the engaged member 81F out of the engaging recess 79a, that is, to disengage the receiving member 78 from the engaged member 81F.

The release rod 87 forms a second operational-force transmission mechanism 12 for transmitting an operational force for releasing the locked state established by the locking mechanism 7. The release rod 87 is operatively connected to the first unlocking mechanism (lower unlocking mechanism) 8 connected to a Bowden wire 89 of a first operational-force transmitting mechanism 11 through a relay member 88 and provided in a lower portion of the back surface of the door 5, and to the second unlocking mechanism (middle unlocking mechanism) 10 provided in a vertical intermediate portion of the back surface of the door 5.

Referring to FIGS. 1 to 6 and 9 to 12, the first unlocking mechanism 8 includes a support member 90 fixed to the lower portion of the back surface of the door 5, an internal control member 9R pivotably supported to the support member 90 through a transverse shaft 90A, and right and left swing members 91 pivotably supported to the support member 90 through right and left longitudinal axes 90B.

The internal control member 9R includes a lever 92B fixed to a tilting member 92A having a substantial U-shape as viewed from the top. Opposite ends of the tilting member 92A are bent forward to be pivotably supported by the transverse shaft 90A, and further bent laterally outward to form pressing portions 92c.

The Bowden wires 89 are connected to upper portions of the right and left swing members 91, and a tension spring 91A is connected between the right and left swing members 91 at a lower portion thereof. Pressing projections 91B projecting laterally outward are formed at intermediate portions of the right and left swing members 91. The pressing portions 92C of the internal control member 9R contact the pressing projections 91B from below.

Figure 1:
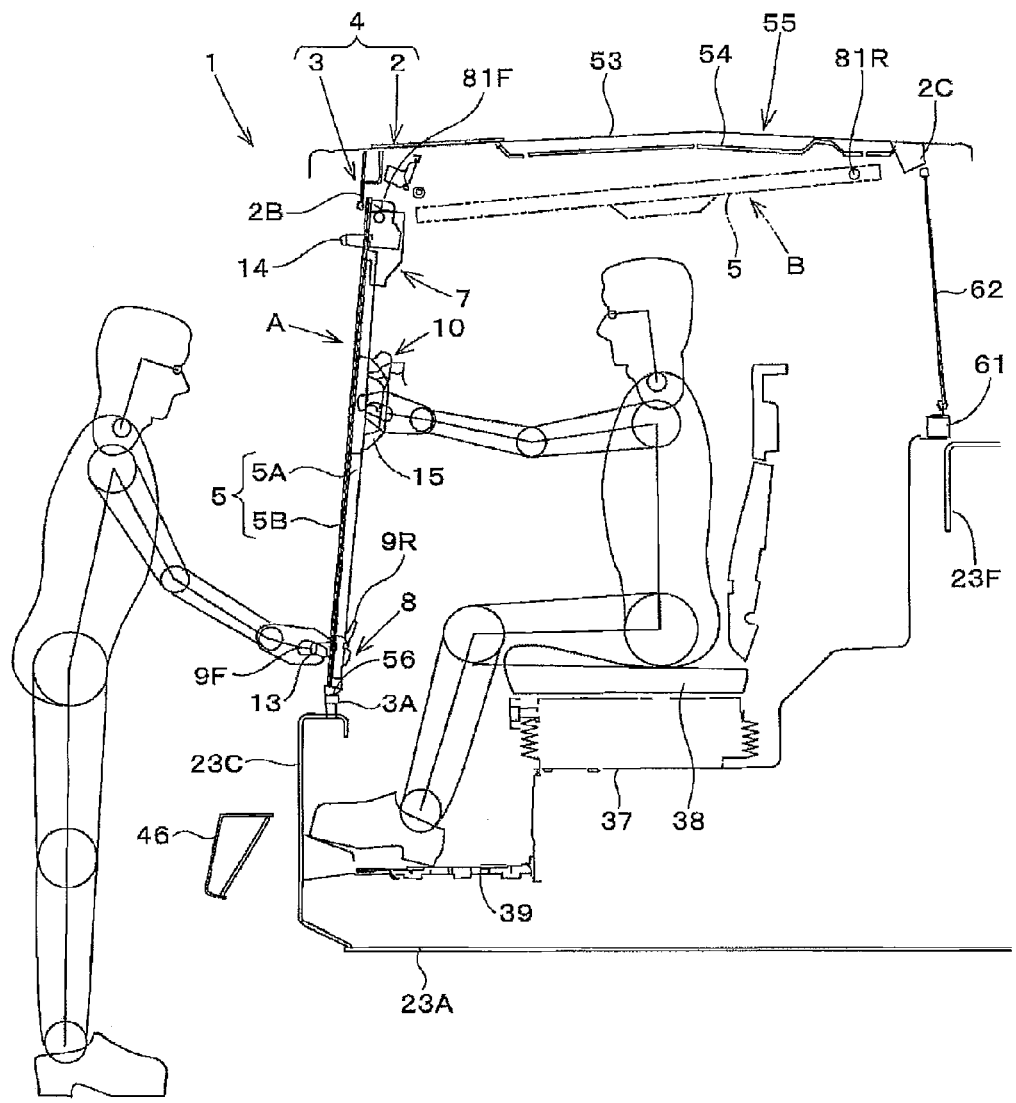
FIG. 1 is a sectional side view of a cabin unit of the present invention in a door closed position.
Figure 2:
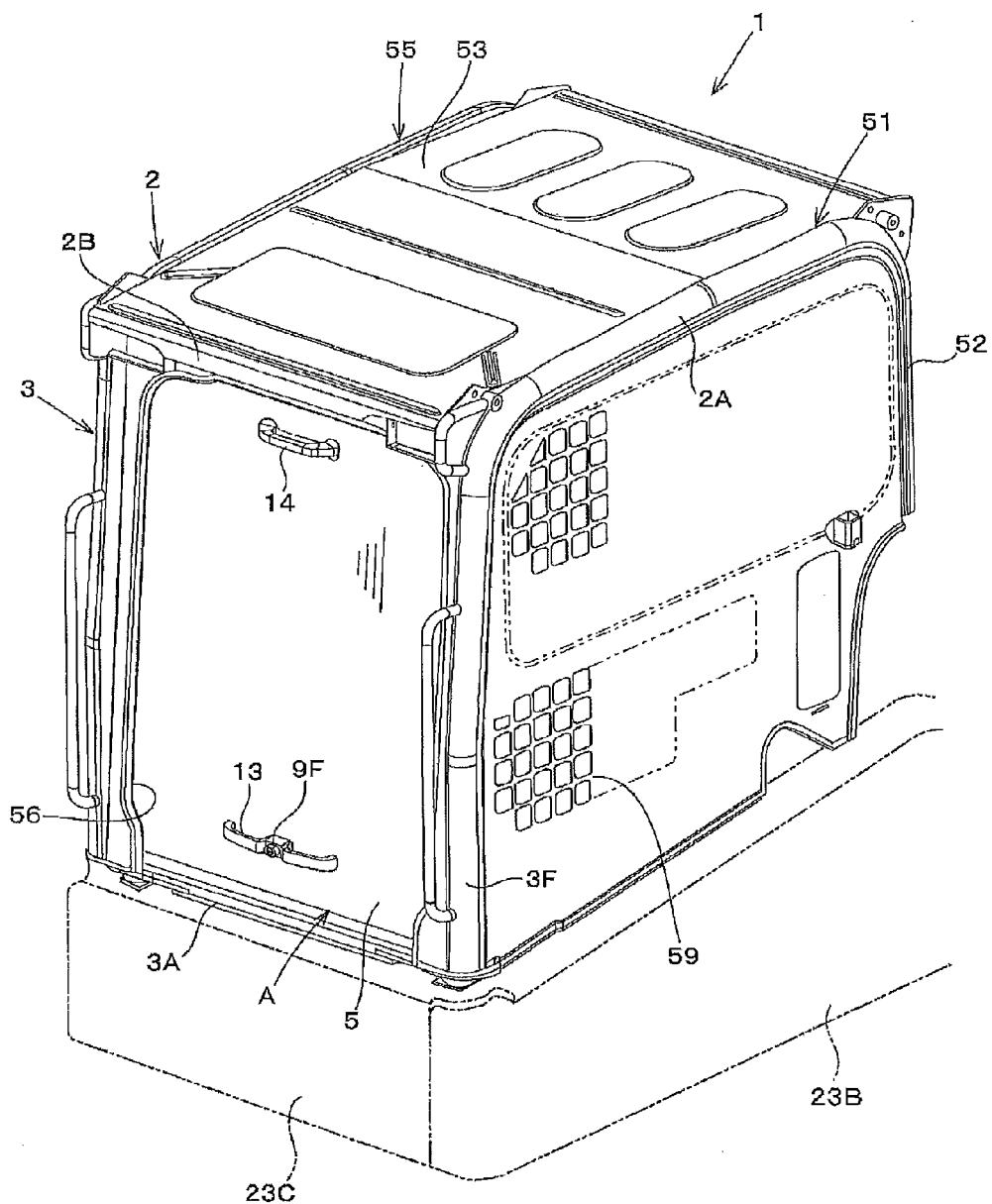
FIG. 2 is a perspective view of the cabin unit.
Figure 3:
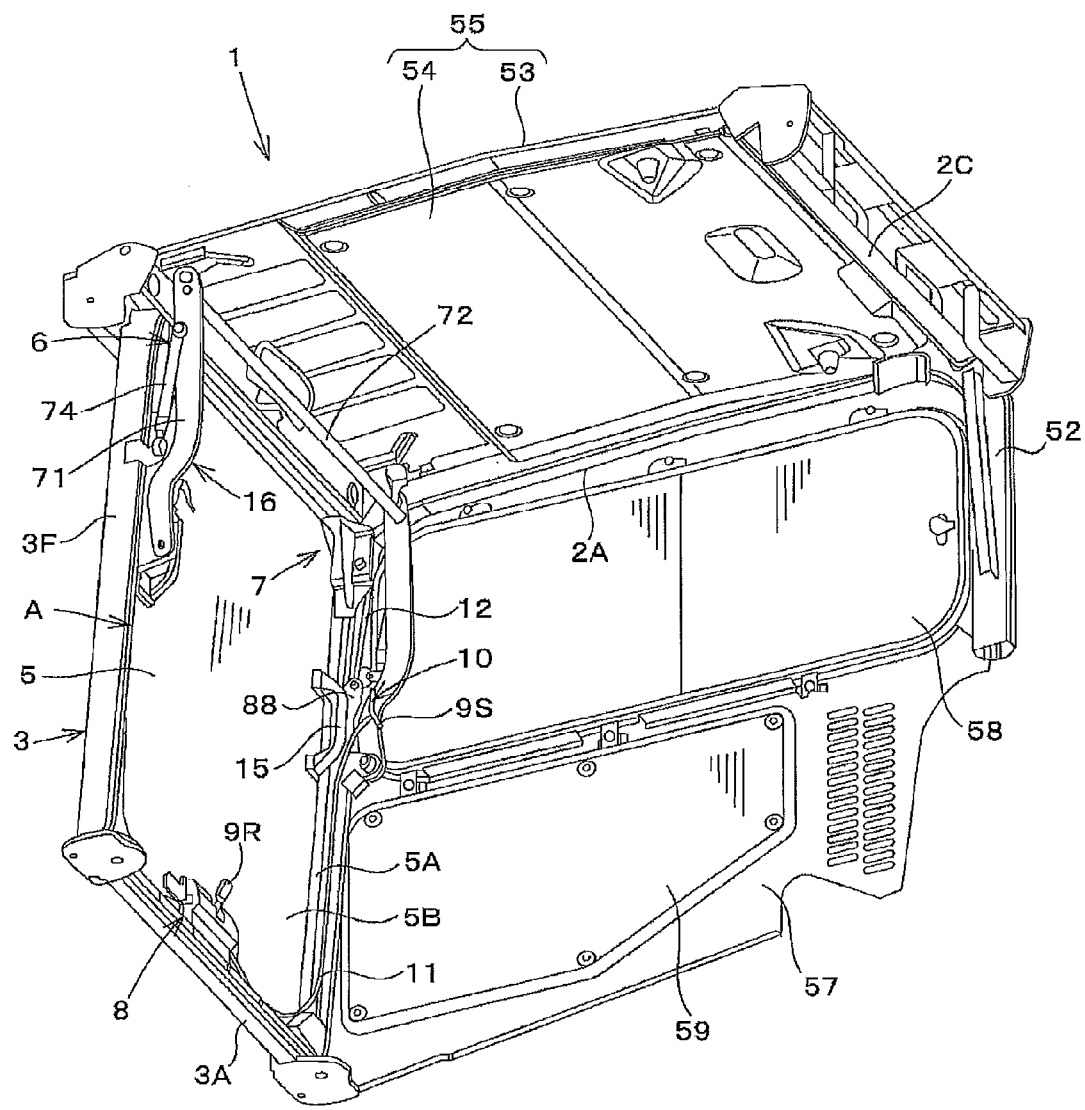
FIG. 3 is a perspective view of the cabin unit in the door closed position as viewed forward and upward from the interior of the cabin unit.
Figure 4:
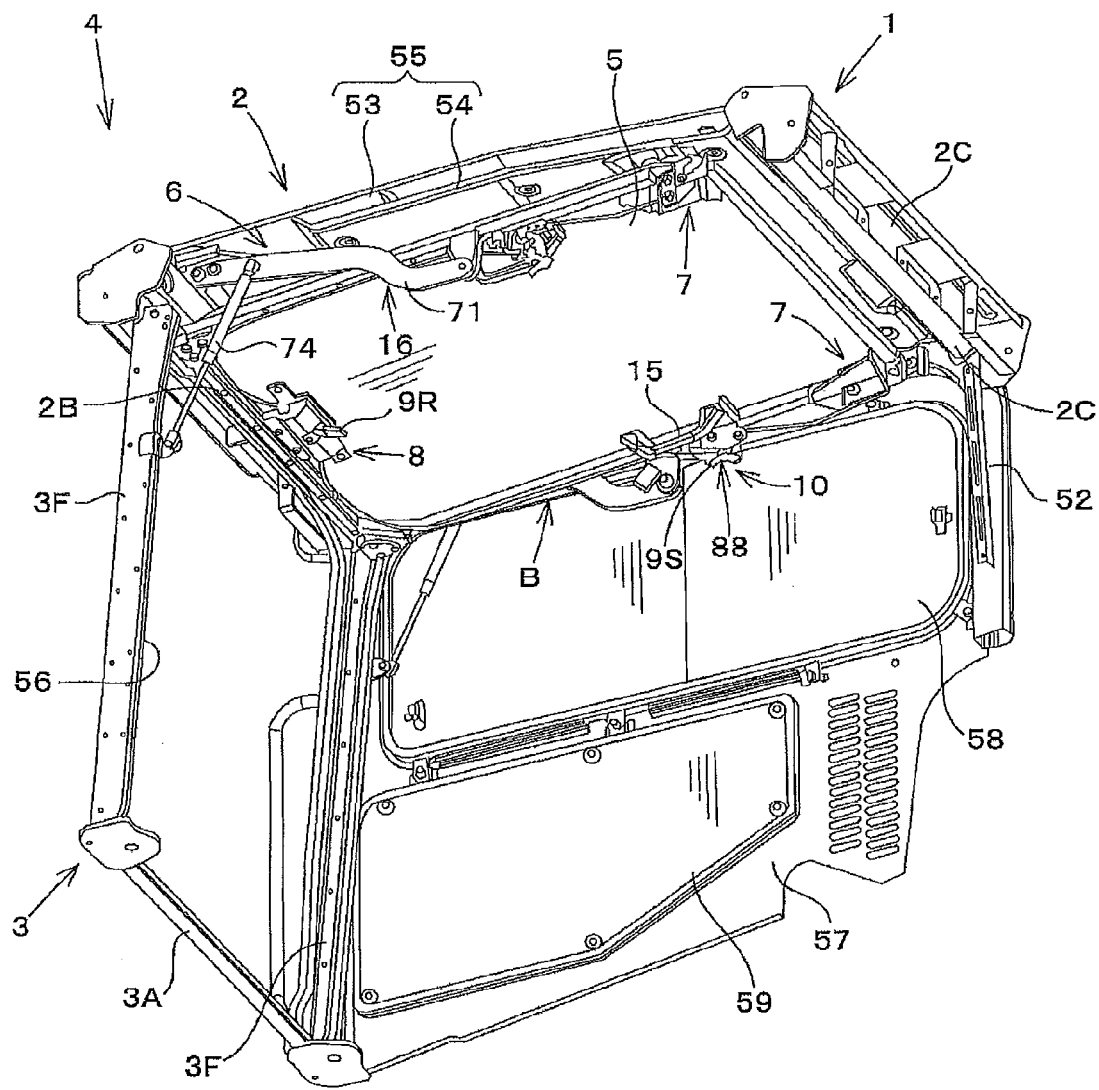
FIG. 4 is a perspective view of the cabin unit in a door open position as viewed forward and upward from the interior of the cabin unit.
Figure 5:
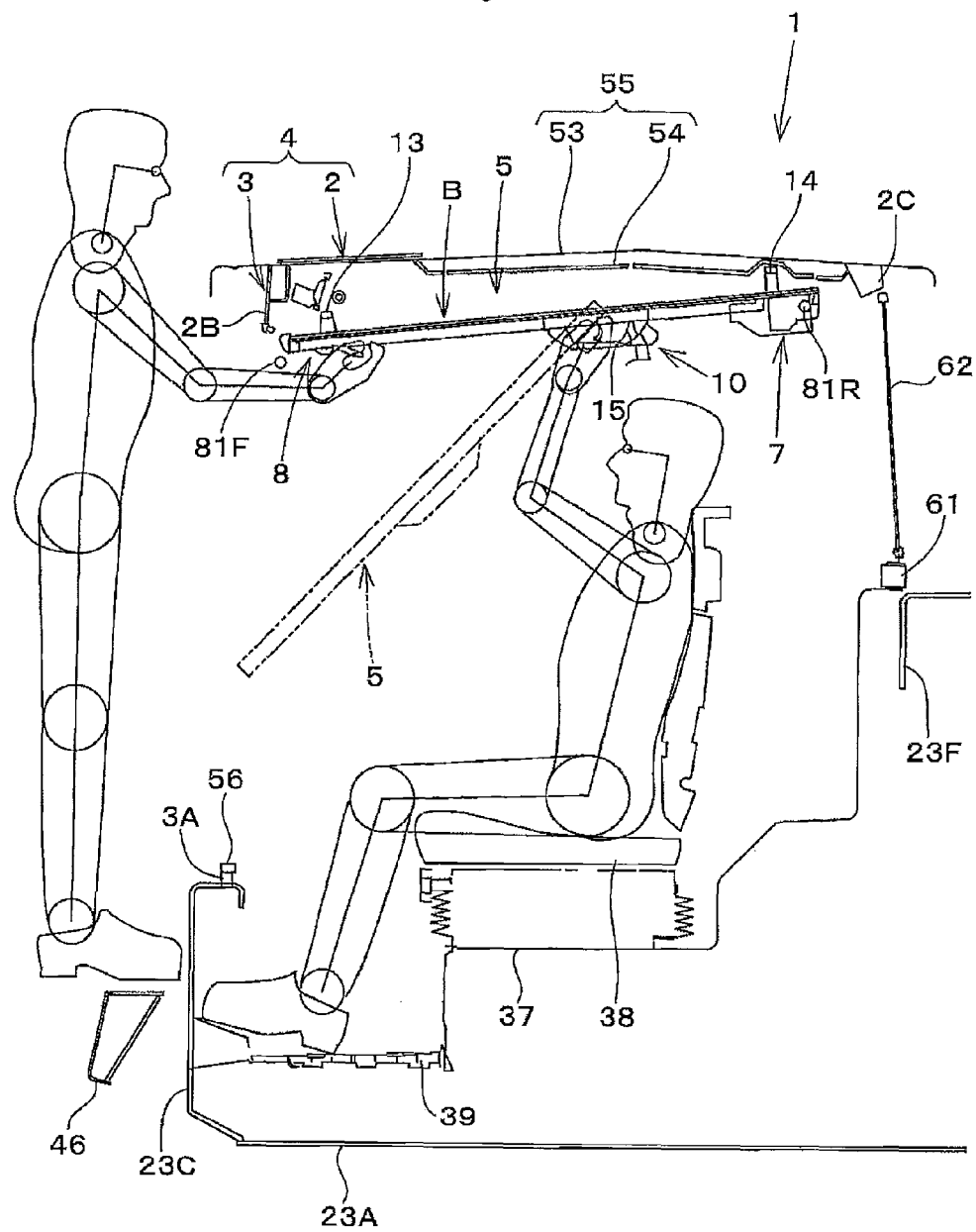
FIG. 5 is a sectional side view of the cabin unit in the door open position.
Figure 6:
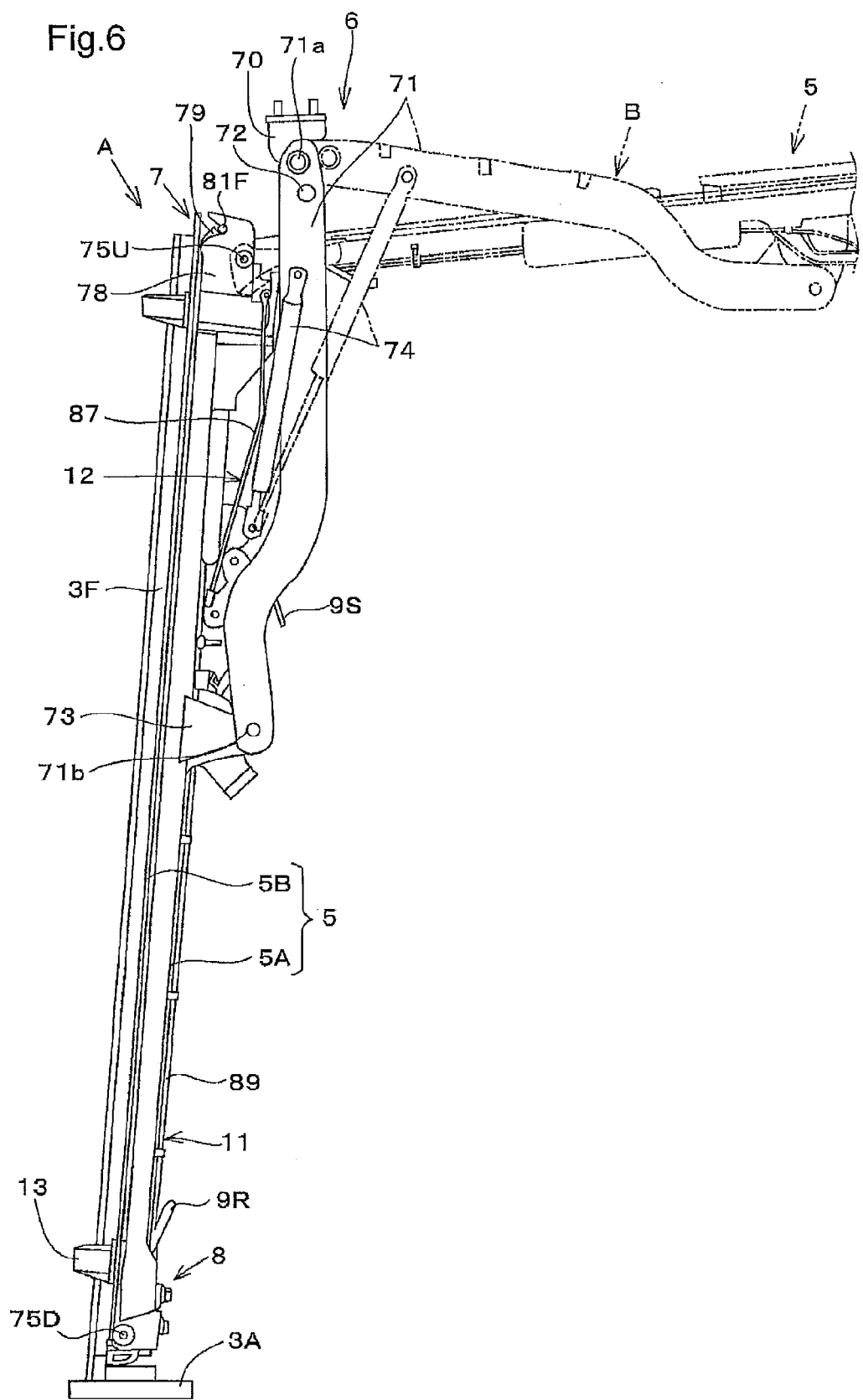
FIG. 6 is a side view of a door and a door opening/closing mechanism.
Figure 7:
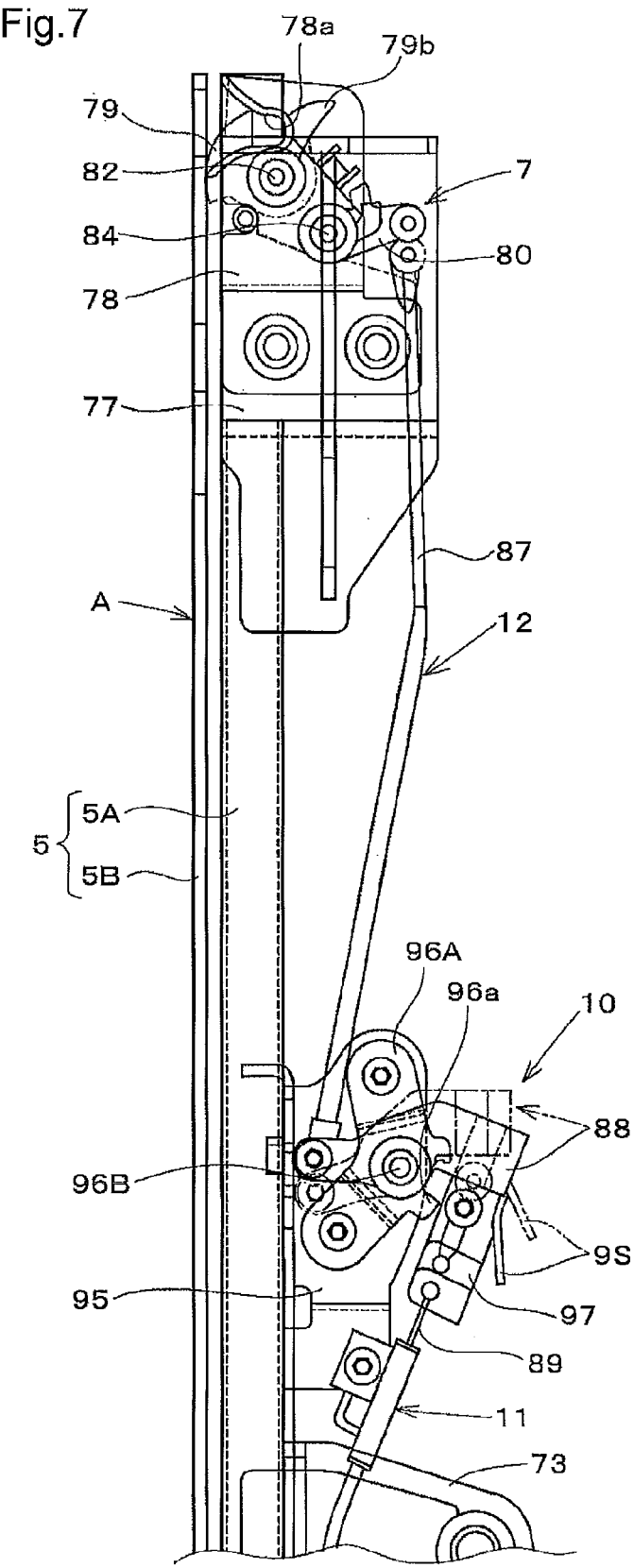
FIG. 7 is a side view of a locking mechanism and a second unlocking mechanism.
Figure 8:
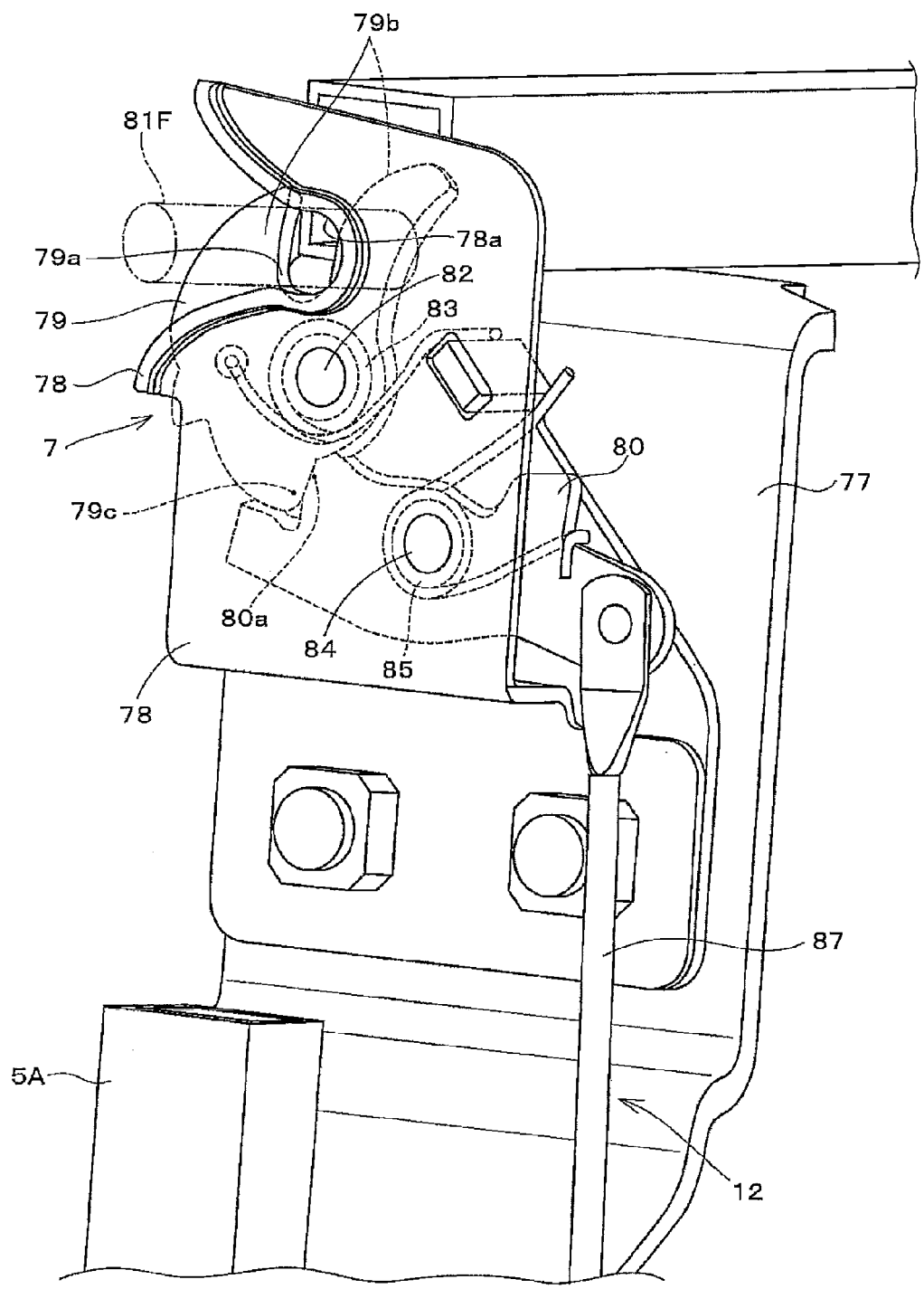
FIG. 8 is a perspective view of the locking mechanism.
Figure 9:
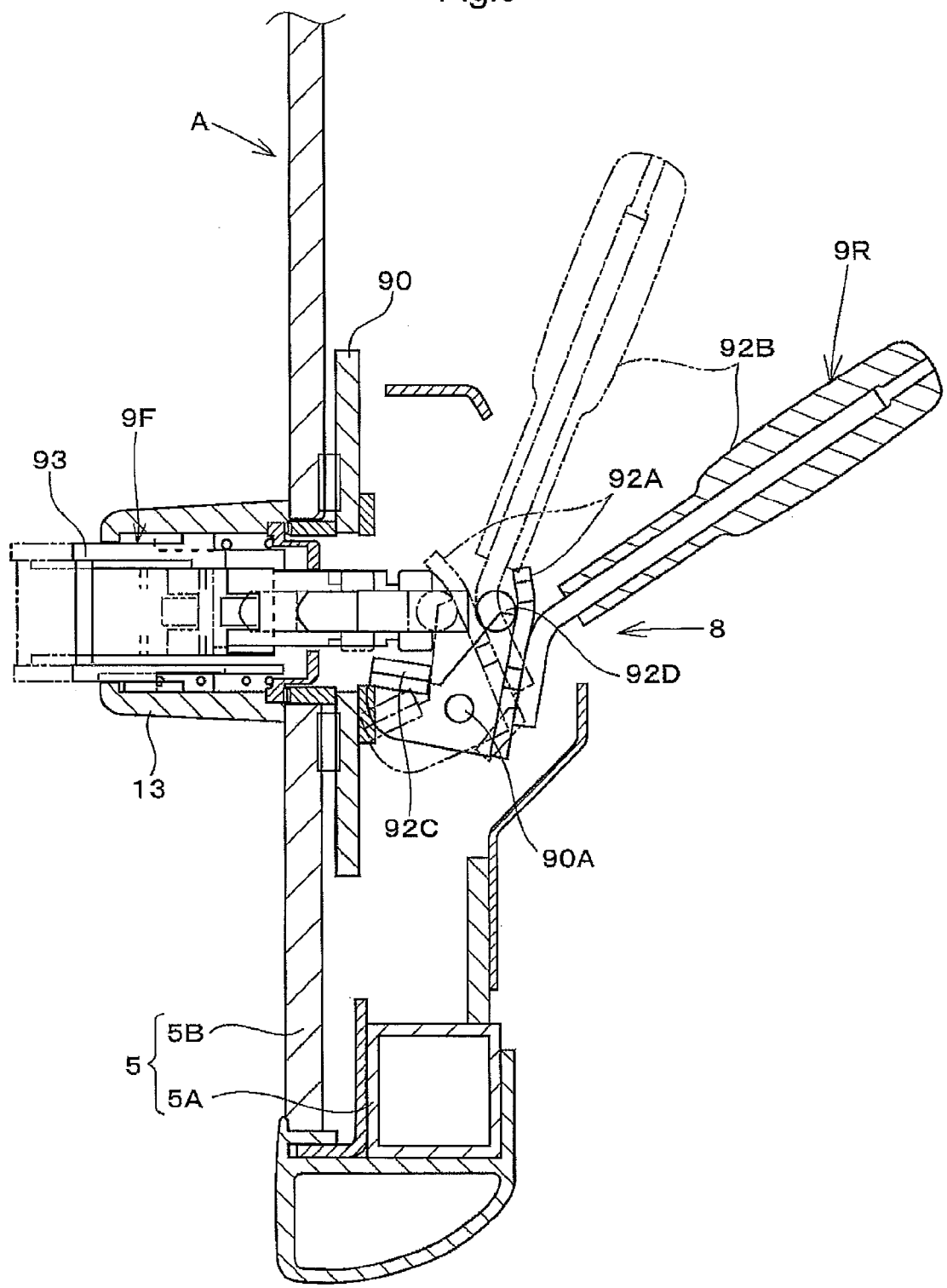
FIG. 9 is a sectional side view of a first unlocking mechanism.
Figure 10:
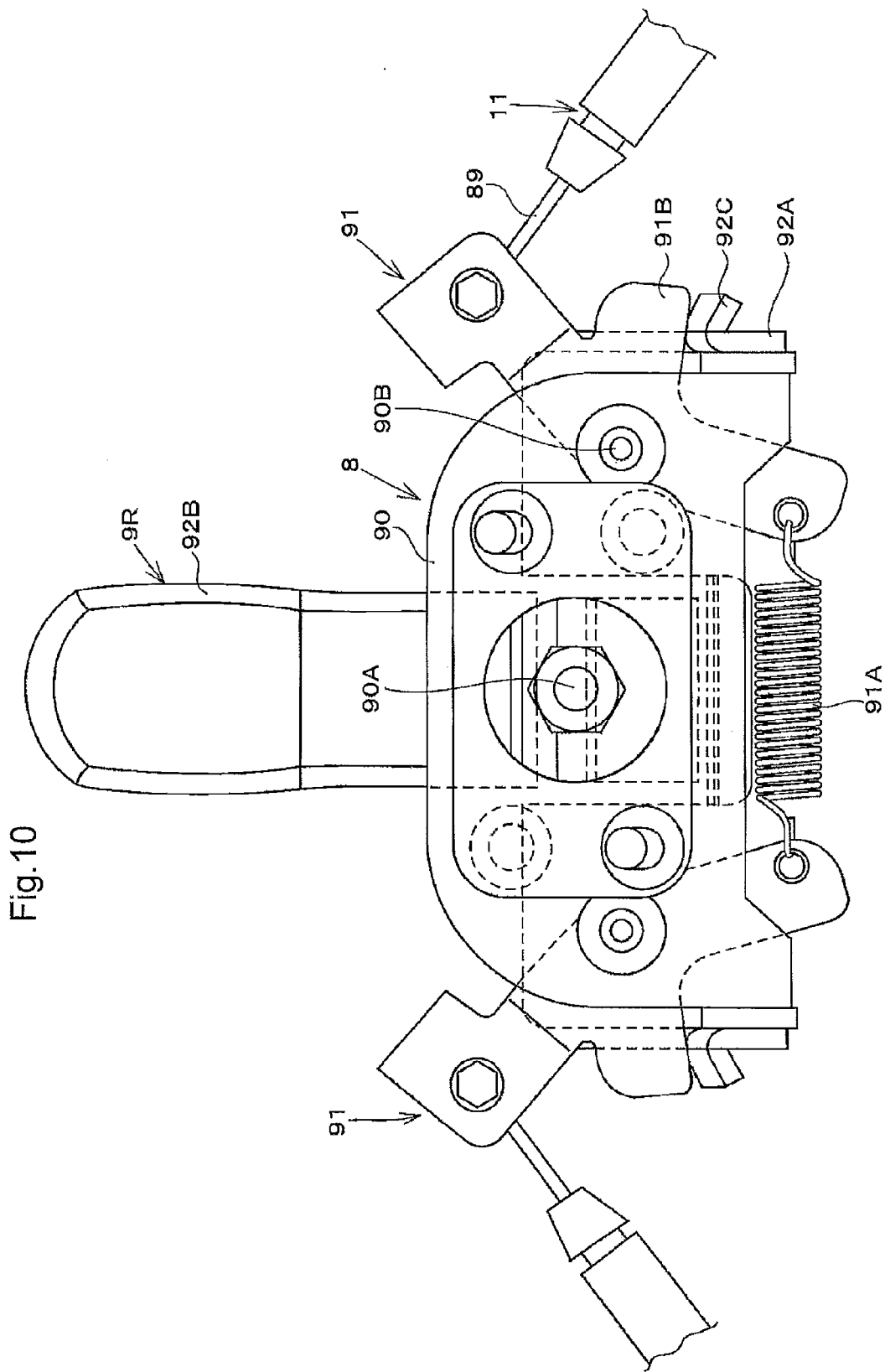
FIG. 10 is a front view of the first unlocking mechanism.
Figure 11:
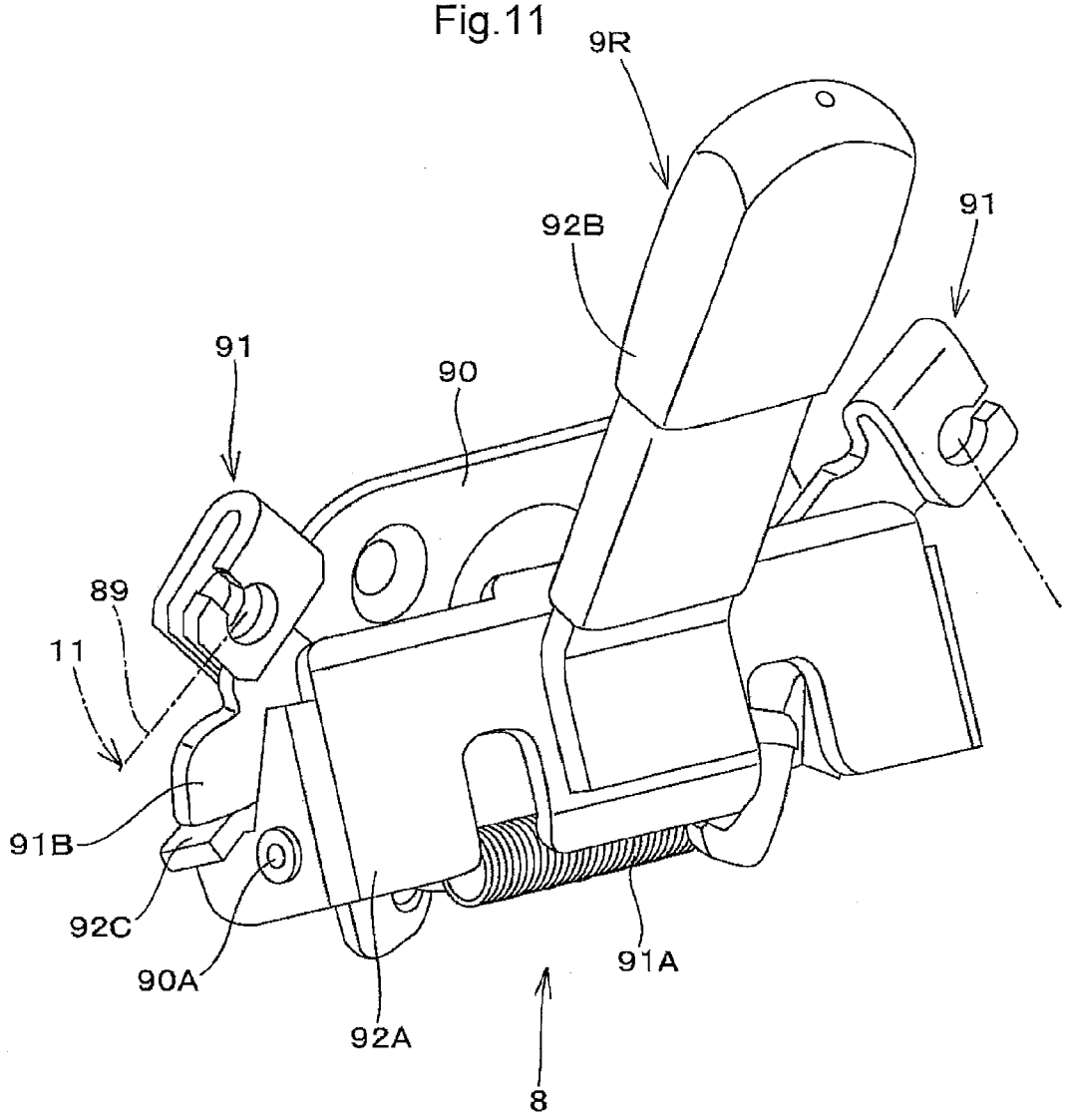
FIG. 11 is a perspective view of the first unlocking mechanism.

As the internal control member 9R is tilted clockwise in FIG. 9, the right and left pressing portions 92C are moved to press the pressing projections 91B to swing the right and left swing members 91 against the tension spring 91A to pull the right and left Bowden wires 89. Those right and left Bowden wires 89 extend upward along the lateral opposite sides of the door frame 5A from the lower portion thereof.

Figure 12:
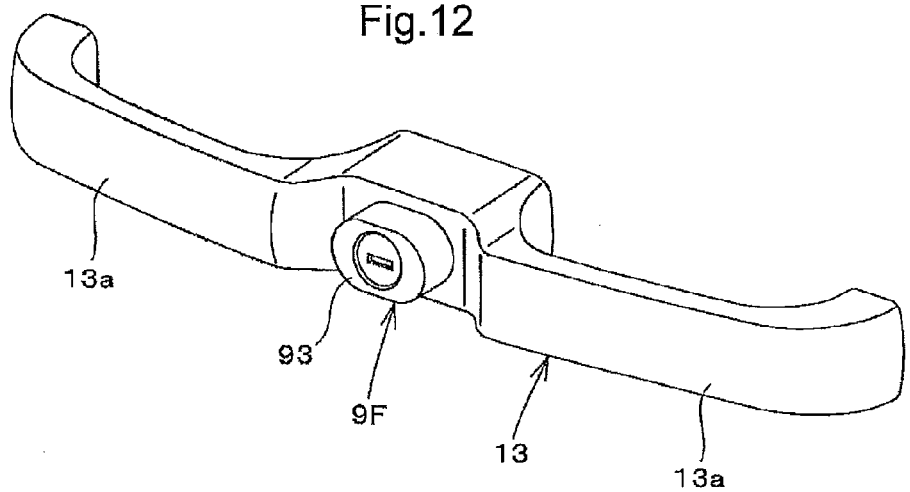
FIG. 12 is a perspective view of a lower handle.

The lower handle 13 is provided in the front surface of the door 5 to face away from the support member 90. As shown in FIG. 12, the lower handle 13 includes a pair of grip portions 13a to be held with either right or left hand of the operator, a cylinder key unit 93 provided between the right and left grip portions 13a extending through the door plate 5B and the support member 90 to reach the tilting member 92A of the internal control member 9R.

The cylinder key unit 93 forms a push-button type external control member 9F. As the external control member 9F is pressed from the outside in an unlocked state, the cylinder key unit 93 is brought into contact with a ball 92D provided in the front surface of the tilting member 92A above the transverse shaft 90A to tilt the tiling member 92A clockwise in FIG. 9. The external control member 91F is inhibited from being operated when the cylinder key unit 93 is locked.

In this way, the first unlocking mechanism 8 is provided in the lower portion of the back surface of the door 5 to allow the unlocking operation either from the back surface of the door 5 using the internal control member 9R or from the front surface of the door 7 using the external control member 9F.

Referring to FIGS. 1 and 3 to 7, the second unlocking mechanisms 10 is provided in the vicinity of each of the middle handles 15 provided in the vertical intermediate portion at the opposite lateral sides of the back surface of the door 5. A tilting movement limiting plate 96A and a support shaft 96B are fixed to a vertical plate 95 projecting from the back surface of the door frame 5A. The relay member 88 is pivotably supported by the support shaft 96B.

The relay member 88 is connected to the release rod 87 at one end thereof and to the Bowden wire 89 at the opposite end portion thereof. The relay member 88 has a lever-like portion at a distal end to form a middle control member 9S that is operable by the operator holding the middle handle 15.

The relay member 88 includes a pawl portion 88a at a middle portion thereof, while the tilting movement limiting plate 96A has a pair of limiting projections 96a for only allowing movement of the pawl portion 88a within a predetermined range and limiting movement of the pawl portion 88a beyond that range.

Figure 13:
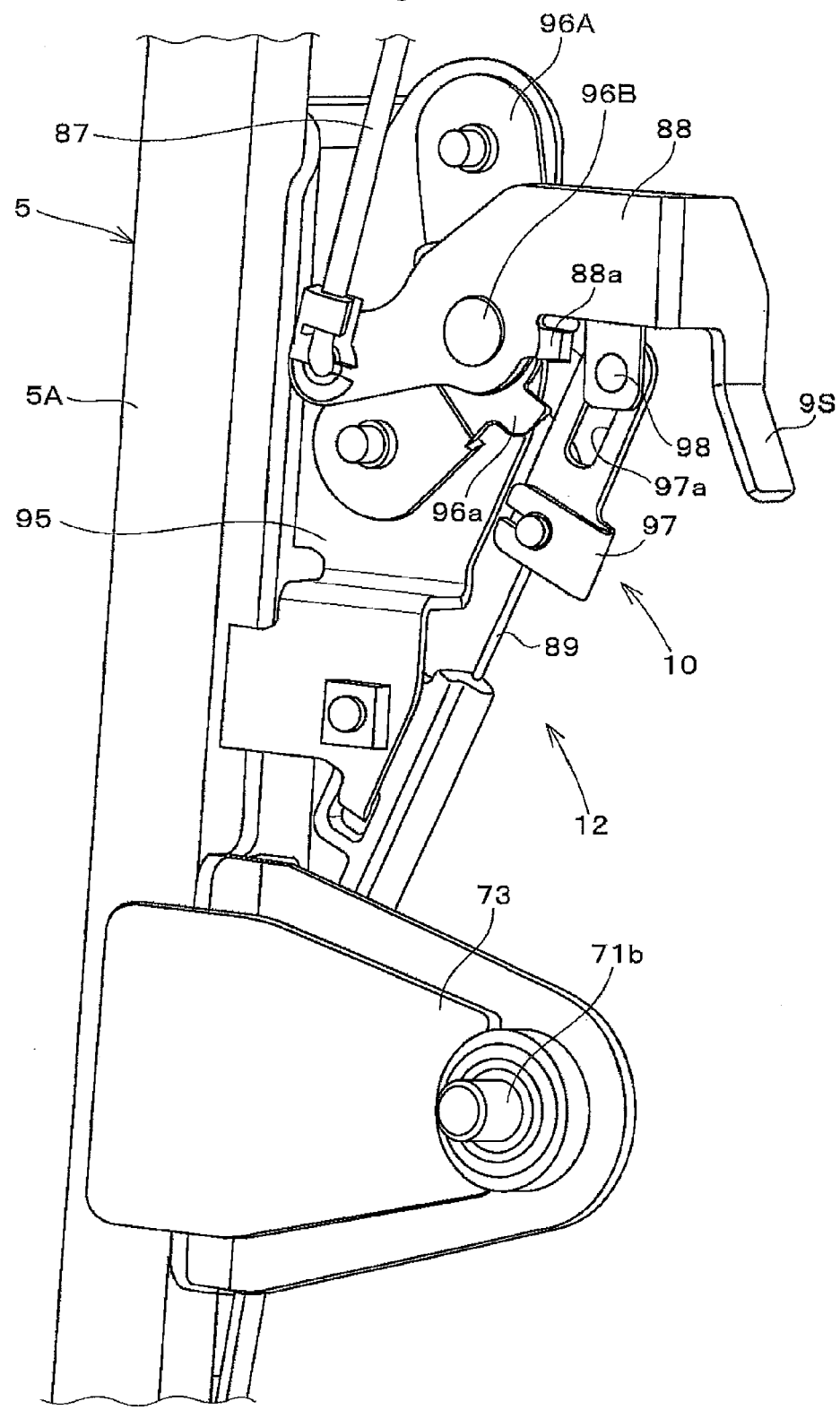
FIG. 13 is a perspective view of the second unlocking mechanism.

The relay member 88 is urged counterclockwise in FIG. 13 by an unillustrated spring fitted on the support shaft 96B to allow the pawl portion 88a to come into contact with upper limiting projection 96a. As the relay member 88 is pivoted clockwise through the middle control member 9S, the release rod 87 is pushed up to unlock the locking mechanism 7.

The tilting movement limiting plate 96A is fitted on the support shaft 96B to be adjusted in position about the support shaft 96B. This arrangement allows the position of the limiting projection 96a to be adjusted about the support shaft 96B to time unlocking of the locking mechanism 7 by the relay member 88 appropriately.

To a distal end of an inner wire of the Bowden wire 89 is connected a connecting member 97 having a slot 97a receiving a connecting pin 98 of the relay member 88. The relay member 88 is tilted clockwise in FIG. 13 by pulling the Bowden wire 89, while the Bowden wire is not pulled or pushed even if the relay member 88 is tilted clockwise in FIG. 13. An outer wire of the Bowden wire 89 is attached to the vertical plate 95.

The Bowden wire 89 and the relay member 88 form the first operational-force transmitting mechanism 11 for connecting the first unlocking mechanism 8 to the second unlocking mechanism 10, while the relay member 88 and the release rod 87 form the second operational-force transmitting mechanism 12 for connecting the second unlocking mechanism 10 to the locking mechanism 7.

[Opening and Closing Operations of the Door of the Cabin Unit]

When the operator enters the cabin unit 1 from the outside, they press the external control member 9F of the door 5 in the closed position A with one hand while holding the lower handle 13 with the other hand to pivot the tilting member 92A about the transverse shaft 90 thereby to swing the swing member 91.

The operational force of the external control member 9F is transmitted from the swing member 91 to the Bowden wire 89 and then to the locking member 80 of the locking mechanism 7 through the relay member 88 and the release rod 87 to disengage the engageable stop portion 80a from the stepped engaging stopper 79C of the engaging member 79 thereby to release the engaging member 79 from a pivotal movement blocking state.

The engaging member 79, after being released from the pivotal movement blocking state, becomes pivotable by the return spring 83 so that the engaging recess 79a is directed forward, while the receiving member 78 is disengaged from the engaged member 81F for closed position. In this state, the operator pulls up the lower handle 13 with one hand while pushing the upper handle 14 into the cabin unit 1 with the other hand.

The door 7 with the locking mechanism 7 being unlocked is moved rearward and upward from the closed position A by the swingable links 71 of the position changing mechanism 16 to the open position B with the front surface up. The receiving member 78 and the engaging member 79 are brought to fit on the engaged member 81R for open position, as a result of which the engaging member 79 is locked by the locking member 80.

When the operator closes the door 5 after entering the cabin unit 1, they hold the middle handles 15 to operate the middle control member 9S of each second unlocking mechanism 10 to pivot the relay member 88 thereby to unlocking the locking member 80 of each locking mechanism 7 through the release rod 87, then moves the door 5 forward and downward to the closed position A while holding the middle handles 15.

When the operator opens the door 5 in the closed position A from the inside of the cabin unit 1, in the similar manner to closing the door 5, they hold the middle handles 15 to operate the middle control member 9S of each second unlocking mechanism 10 to pivot the relay member 88 thereby to unlocking each locking mechanism 7. Then, the operator moves the door 5 rearward and upward to the open position B while holding the middle handles 15.

When the operator closes the door 5 in the open position B from the outside of the cabin unit 1, they operate the internal control member 9R provided in the lower portion of the door 5 and positioned in the front portion of the ceiling frame 2 in the open position B since it is difficult for the operator to reach their hand to the second unlocking mechanism 10. The internal control member 9R is provided to be directed downwardly at the upper portion of the entrance 56 within the door open frame 3 and thus easily operable from the outside of the cabin unit 1. The operator operates the internal control member 9R to unlock the locking mechanism 7 through the first operational-force transmitting mechanism 11 and the second operational-force transmitting mechanism 12 to move the door 5 downward to the closed position A while holding the lower handle 13.

When the operator changes the position of the door 5 in the closed position A or open position B from the inside of the cabin unit 1, they may use the first unlocking mechanism 8 instead of the second unlocking mechanisms 10 to unlock the locking mechanism 7 to introductorily slightly move the door 5, then hold the middle handles 15 to fully move the door 5.

In the present invention, it is most preferable that the respective elements described in relation to the above-noted embodiment have the shapes and the positional relationships in the longitudinal, transverse and vertical directions as shown in FIGS. 1 to 14. On the other hand, it will be understood that the cabin unit of the present invention is not limited to the current embodiment, but may be varied in element, structure, or combination of the elements.

For example, the first unlocking mechanism 8 is preferably provided in the lower portion of the door 5, but may be provided in a vertical intermediate portion in the vicinity of the lower portion of the door 5.

Further, the second releasing mechanism 10 is dispensable. In this case, the locking mechanism 7 is connected to the first unlocking mechanism 8 through the first operational-force transmitting mechanism 11 to allow the locking mechanism 7 to be always unlocked by the first unlocking mechanism 8 when the door 5 is moved either from the closed position A or the open position B.

Still further, an additional handle may be provided in a vertical intermediate portion of the front surface of the door 5 or in an upper or lower portion of the back surface of the door 5, for example.

What is claimed is:

1. A cabin unit for a work machine comprising:
a cabin frame including a ceiling frame forming a top portion of the cabin frame, and a door open frame forming a front portion of the cabin frame;
a door provided in the door open frame;
a door opening/closing mechanism for supporting the door from the door open frame to the ceiling frame to be moved rearward and upward from a closed position for closing the door to an open position in which a front surface of the door in the closed position is directed upward;
a locking mechanism provided in an upper portion of the door for limiting movement of the door when in the closed position or the open position; and
a first unlocking mechanism provided in the door for unlocking the locking mechanism, the first unlocking mechanism including an internal control member provided in an inside lower portion of the door in the closed position for releasing the locked state from the inside of the door, and an external control member provided in an outside lower portion of the door in the closed position for releasing the locked state from the outside of the door.

2. The cabin unit as claimed in claim 1, wherein second unlocking mechanisms are provided in vertical intermediate portions at lateral opposite sides of a back surface of the door.

3. The cabin unit as claimed in claim 2, wherein the first unlocking mechanism is connected to each of the second unlocking mechanisms through a first operational-force transmitting mechanism, and each of the second unlocking mechanisms is connected to the locking mechanism through a second operational-force transmitting mechanism.

4. The cabin unit as claimed in claim 2, wherein a lower handle is provided in a lower portion of a front surface of the door in the vicinity of the first unlocking mechanism, an upper handle is provided in an upper portion of the front surface of the door, and a middle handle is provided in each of the second unlocking mechanism.

* * * * *